(12) United States Patent
Sinclair

(10) Patent No.: US 8,473,669 B2
(45) Date of Patent: Jun. 25, 2013

(54) METHOD AND SYSTEM FOR CONCURRENT BACKGROUND AND FOREGROUND OPERATIONS IN A NON-VOLATILE MEMORY ARRAY

(75) Inventor: Alan W. Sinclair, Falkirk (GB)

(73) Assignee: SanDisk Technologies Inc., Plano, TX (US)

( * ) Notice: Subject to any disclaimer, the term of this patent is extended or adjusted under 35 U.S.C. 154(b) by 255 days.

(21) Appl. No.: 12/632,549

(22) Filed: Dec. 7, 2009

(65) Prior Publication Data

US 2011/0138100 A1 Jun. 9, 2011

(51) Int. Cl.
*G06F 12/00* (2006.01)

(52) U.S. Cl.
USPC ..................... 711/103; 365/185.33

(58) Field of Classification Search
USPC ..................... 711/103; 365/185.33
See application file for complete search history.

(56) References Cited

U.S. PATENT DOCUMENTS

| | | |
|---|---|---|
| 5,535,369 A | 7/1996 | Wells et al. |
| 5,570,315 A | 10/1996 | Tanaka et al. |
| 5,630,093 A | 5/1997 | Holzhammer et al. |
| 5,774,397 A | 6/1998 | Endoh et al. |
| 5,860,124 A | 1/1999 | Matthews et al. |
| 5,960,169 A | 9/1999 | Styczinski |
| 6,046,935 A | 4/2000 | Takeuchi et al. |
| 6,069,827 A | 5/2000 | Sinclair |
| 6,373,746 B1 | 4/2002 | Takeuchi et al. |
| 6,456,528 B1 | 9/2002 | Chen |
| 6,522,580 B2 | 2/2003 | Chen et al. |
| 6,622,199 B1 | 9/2003 | Spall et al. |
| 6,715,027 B2 | 3/2004 | Kim et al. |
| 6,725,321 B1 | 4/2004 | Sinclair et al. |
| 6,771,536 B2 | 8/2004 | Li et al. |
| 6,781,877 B2 | 8/2004 | Cernea et al. |
| 7,154,781 B2 | 12/2006 | Lakhani et al. |
| 7,420,867 B2 * | 9/2008 | Brox ........................ 365/230.03 |
| 7,433,993 B2 | 10/2008 | Sinclair |
| 7,552,280 B1 | 6/2009 | Naamad et al. |
| 7,930,468 B2 * | 4/2011 | Caulkins ....................... 711/103 |

(Continued)

FOREIGN PATENT DOCUMENTS

| | | |
|---|---|---|
| EP | 1 143 455 A2 | 10/2001 |
| EP | 1 389 755 A2 | 2/2004 |
| EP | 1 693 759 A2 | 8/2006 |

OTHER PUBLICATIONS

Chang et al., "An Efficient Management Scheme for Large-Scale Flash-Memory Storage Systems", dated Mar. 14-17, 2004 (7 pages).

(Continued)

*Primary Examiner* — Hashem Farrokh
(74) *Attorney, Agent, or Firm* — Brinks Hofer Gilson & Lione

(57) ABSTRACT

A method and system for permitting host write operations in one part of a flash memory concurrently with another operation in a second part of the flash memory is disclosed. The method includes receiving data at a front end of a memory system, selecting at least one of a plurality of subarrays in the memory system for executing a host write operation, and selecting at least one other subarray in which to execute a second operation. The write operation and second operation are then executed substantially concurrently. The memory system includes a plurality of subarrays, each associated with a separate subarray controller, and a front end controller adapted to select and initiate concurrent operations in the subarrays.

26 Claims, 13 Drawing Sheets

U.S. PATENT DOCUMENTS

| | | | |
|---|---|---|---|
| 8,095,735 B2 * | 1/2012 | Brewer et al. | 711/127 |
| 2003/0109093 A1 | 6/2003 | Harari et al. | |
| 2003/0147278 A1 | 8/2003 | Tanaka et al. | |
| 2003/0229753 A1 | 12/2003 | Hwang et al. | |
| 2004/0030847 A1 | 2/2004 | Tremaine | |
| 2004/0260957 A1 | 12/2004 | Jeddeloh et al. | |
| 2005/0144361 A1 | 6/2005 | Gonzalez et al. | |
| 2005/0144363 A1 | 6/2005 | Sinclair | |
| 2005/0195635 A1 | 9/2005 | Conley et al. | |
| 2006/0020744 A1 | 1/2006 | Sinclair et al. | |
| 2006/0031593 A1 | 2/2006 | Sinclair | |
| 2006/0047800 A1 * | 3/2006 | Caveney et al. | 709/223 |
| 2006/0161724 A1 | 7/2006 | Bennett et al. | |
| 2006/0161728 A1 | 7/2006 | Bennett et al. | |
| 2006/0285397 A1 | 12/2006 | Nishihara et al. | |
| 2007/0033323 A1 * | 2/2007 | Gorobets | 711/103 |
| 2007/0033330 A1 | 2/2007 | Sinclair et al. | |
| 2007/0033378 A1 | 2/2007 | Sinclair et al. | |
| 2007/0136555 A1 | 6/2007 | Sinclair | |
| 2007/0239928 A1 | 10/2007 | Gera et al. | |
| 2008/0034154 A1 | 2/2008 | Lee et al. | |
| 2008/0094952 A1 | 4/2008 | Brondijk et al. | |
| 2008/0307164 A1 | 12/2008 | Sinclair | |
| 2008/0307192 A1 | 12/2008 | Sinclair et al. | |
| 2008/0320209 A1 * | 12/2008 | Lee et al. | 711/103 |
| 2009/0157994 A1 * | 6/2009 | Hampel et al. | 711/168 |
| 2009/0172258 A1 | 7/2009 | Olbrich et al. | |
| 2009/0172263 A1 | 7/2009 | Olbrich et al. | |
| 2009/0196102 A1 * | 8/2009 | Kim | 365/185.11 |
| 2009/0271562 A1 | 10/2009 | Sinclair | |
| 2011/0138100 A1 | 6/2011 | Sinclair | |
| 2012/0084489 A1 | 4/2012 | Gorobets et al. | |

OTHER PUBLICATIONS

International Search Report issued in international application No. PCT/US2010/056122, mailed May 20, 2011 (5 pages).

Written Opinion issued in international application No. PCT/US2010/056122, mailed May 20, 2011 (6 pages).

International Preliminary Report on Patentability for International Application No. PCT/US2010/056122, mailed Jun. 21, 2012 (6 pages).

F. Shu, "Notification of Deleted Data Proposal for ATA8-ACS2", Microsoft Corporation, dated Apr. 21, 2007, printed from the Internet at http://www.t13.org/documents/UploadedDocuments//docs2007/e07154r0-Notification_for_Deleted_Data_Proposal_for_ATA-ACS2.doc on Feb. 22, 2008 (4 pages).

F. Shu, "Solid State Drive Identify Proposal for ATA8-ACS", Microsoft Corporation, dated Apr. 21, 2007, printed from the Internet at http://www.t13.org/documents/UploadedDocuments//docs2007/e07153r0-Soild_State_Drive_Identify_Proposal.doc on Feb. 22, 2008 (4 pages).

International Search Report and Written Opinion for international application No. PCT/US2008/065631, dated Oct. 30, 2008 (9 pages).

International Search Report for international application No. PCT/US2009/040153, mailed on Jul. 10, 2009 (3 pages).

Office Action issued in European patent application No. 09733928.7, dated Aug. 22, 2012 (6 pages).

Office Action issued in U.S. Appl. No. 12/036,014, dated Sep. 28, 2011 (11 pages).

Office Action issued in U.S. Appl. No. 12/036,023, dated Apr. 12, 2011 (16 pages).

Office Action issued in U.S. Appl. No. 12/036,023, dated Nov. 8, 2011 (17 pages).

Office Action issued in U.S. Appl. No. 12/110,050, dated Jul. 7, 2011 (18 pages).

Office Action issued in U.S. Appl. No. 12/110,050, dated Mar. 14, 2012 (21 pages).

Office Action issued in U.S. Appl. No. 12/110,050, dated Nov. 19, 2012 (25 pages).

Office Action issued in U.S. Appl. No. 12/895,383, dated May 22, 2012 (5 pages).

Notice of Allowance issued in U.S. Appl. No. 12/895,383, dated Oct. 12, 2012 (7 pages).

Supplemental Notice of Allowability issued in U.S. Appl. No. 12/895,383, dated Nov. 20, 2012 (4 pages).

Preliminary Report on Patentability and Written Opinion of the International Searching Authority for related application No. PCT/US2008/065631, mailed Dec. 23, 2009 (9 pages).

Written Opinion for international application No. PCT/US2009/040153 mailed on Jul. 10, 2009 (5 pages).

* cited by examiner

FIG. 12

| LBA Metapage | LBA subarray address ||||| |
|---|---|---|---|---|---|
| | Bank | Slice | Metablock | Metapage |
| 0 | 0 | 0 | 0 | 0 |
| 1 | 1 | 0 | 0 | 0 |
| 2 | 2 | 0 | 0 | 0 |
| 3 | 3 | 0 | 0 | 0 |
| 4 | 0 | 0 | 0 | 1 |
| 5 | 1 | 0 | 0 | 1 |
| 6 | 2 | 0 | 0 | 1 |
| 7 | 3 | 0 | 0 | 1 |
| ... | ... | ... | ... | ... |
| 511 | 3 | 0 | 0 | 127 |
| 512 | 0 | 1 | 0 | 0 |
| ... | ... | ... | ... | ... |
| 1020 | 0 | 1 | 0 | 127 |
| 1021 | 1 | 1 | 0 | 127 |
| 1022 | 2 | 1 | 0 | 127 |
| 1023 | 3 | 1 | 0 | 127 |
| 1024 | 0 | 0 | 1 | 0 |
| 1025 | 1 | 0 | 1 | 1 |
| 1026 | 2 | 0 | 1 | 1 |
| 1027 | 3 | 0 | 1 | 1 |
| ... | ... | ... | ... | ... |
| 1536 | 0 | 1 | 1 | 0 |
| ... | ... | ... | ... | ... |

METHOD AND SYSTEM FOR CONCURRENT BACKGROUND AND FOREGROUND OPERATIONS IN A NON-VOLATILE MEMORY ARRAY

TECHNICAL FIELD

This application relates generally to managing data in a memory system. More specifically, this application relates to the operation of a memory system to allow for concurrent background and foreground operations in re-programmable non-volatile semiconductor flash memory.

BACKGROUND

When writing data to a conventional flash data memory system, a host typically assigns unique logical addresses to sectors, clusters or other units of data within a continuous virtual address space of the memory system. The host writes data to, and reads data from, addresses within the logical address space of the memory system. The memory system then commonly maps data between the logical address space and the physical blocks or metablocks of the memory, where data is stored in fixed logical groups corresponding to ranges in the logical address space. Generally, each fixed logical group is stored in a separate physical block of the memory system. The memory system keeps track of how the logical address space is mapped into the physical memory but the host is unaware of this. The host keeps track of the addresses of its data files within the logical address space but the memory system operates without knowledge of this mapping.

In high-capacity solid state data storage systems, the number of semiconductor memory chips can be large, but only a portion of the semiconductor memory chips making up the high-capacity system is active at any time for servicing input and output requests from the host system. When such a request from a host is being serviced, the memory controller frequently has to interleave operations on host data with internal operations for managing the organization of stored data within the memory chips. These interleaved operations can reduce the overall performance of a memory system.

BRIEF SUMMARY

In order to address the need for improved memory management in a multi-bank memory system, methods and systems are disclosed herein for allowing concurrent host write operations and secondary operations, where the secondary operation may be an operation such as a garbage collection, read or copy operation. According to a first embodiment, a method of operating a memory system having an array of non-volatile memory cells is described. The method includes receiving data at a front end of the memory system from a host, where the data is associated with a plurality of host logical block addresses (LBAs). The memory system selects at least one subarray of a plurality of subarrays in the array in which to execute a host write operation for the received data. Each of the plurality of subarrays is associated with a unique, fixed region of host LBA addresses, which may be continuous or discontinuous, and each of the plurality of subarrays is associated with a separate subarray controller. The memory system selects at least one other subarray of the plurality of subarrays in which to execute a second operation on data already residing in the other subarray. The memory system executes the host write operation and the second operation substantially concurrently in the at least one subarray and the at least one other subarray.

According to another embodiment, a memory system includes an array of non-volatile memory cells arranged into a plurality of subarrays, each subarray addressed by a unique, fixed set of host logical block address (LBA) addresses. The unique, fixed set of host LBA addresses may be interleaved. The memory system also includes plurality of subarray controllers, each of the plurality of subarray controllers configured to control data read or write operations in a respective one of the plurality of subarrays independent of read or write operations in any other of the plurality of subarrays. A front end controller in the memory system is in communication with the plurality of subarray controllers, where the front end controller is adapted to select at least one subarray of a plurality of subarrays in the array in which to execute a host write operation for data received from a host, select at least one other subarray of the plurality of subarrays in which to execute a second operation, and initiate execution of the host write operation and the second operation substantially concurrently in the at least one subarray and the at least one other subarray.

The number of concurrent foreground and background operations permitted may be controlled by the system in certain circumstances. Also, the physical subarrays may be arranged in a two-dimensional array composed of separate banks in the x-direction, and in separate slices in the y-direction. In this arrangement, the subarrays may be pre-assigned to host LBA addresses such that contiguous host LBA addresses are interleaved in the x-direction by metapage and in the y-direction by metablock.

Other features and advantages will become apparent upon review of the following drawings, detailed description and claims. Additionally, other embodiments are disclosed, and each of the embodiments can be used alone or together in combination. The embodiments will now be described with reference to the attached drawings.

BRIEF DESCRIPTION OF THE DRAWINGS

FIG. 12 is a table mapping host LBA metapages to subarrays illustrated in FIG. 11.

DETAILED DESCRIPTION

Figure 1:
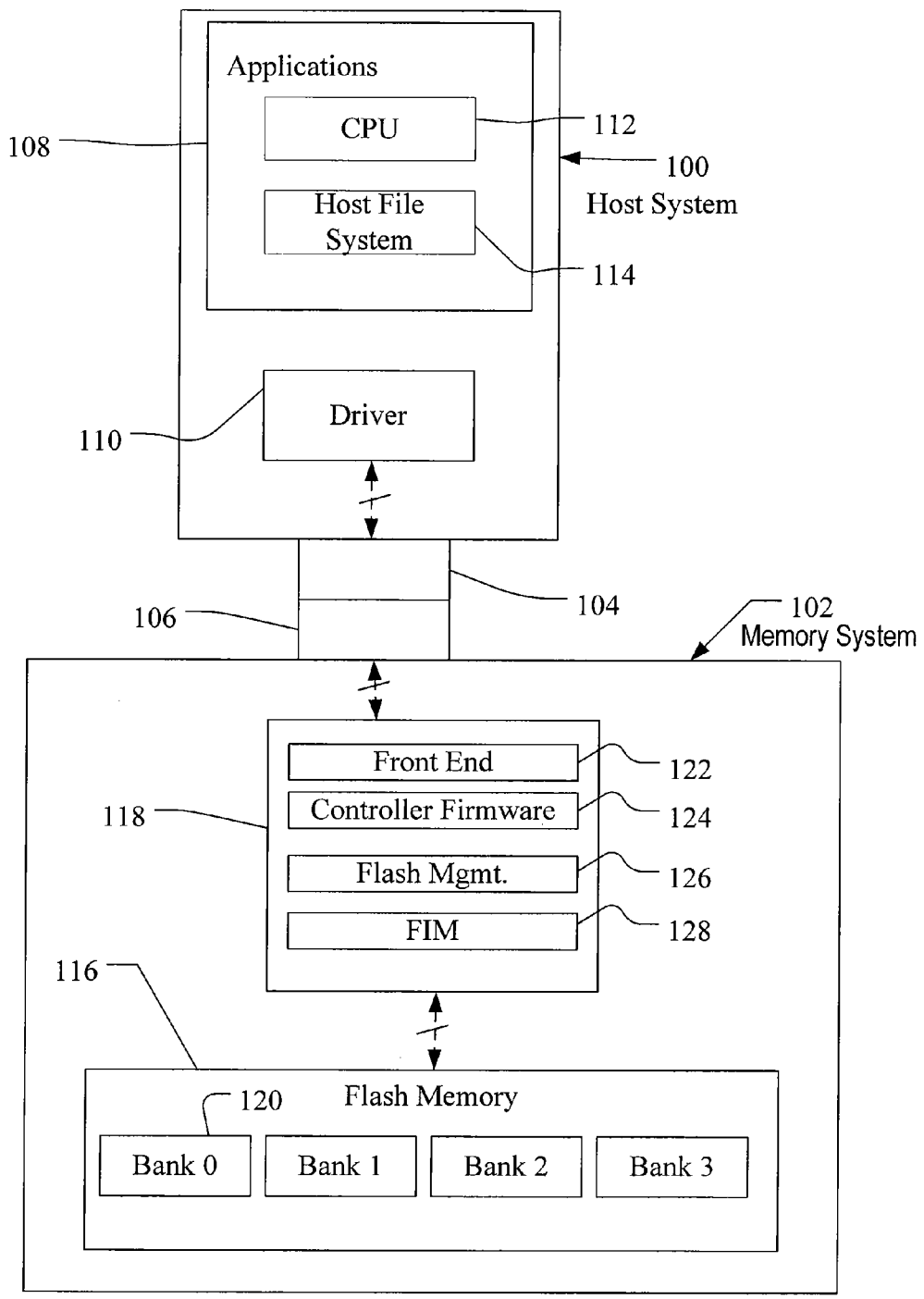
FIG. 1 illustrates a host connected with a memory system having multi-bank non-volatile memory.

A flash memory system suitable for use in implementing aspects of the invention is shown in FIGS. 1-7. A host system 100 of FIG. 1 stores data into and retrieves data from a memory system 102. The memory system may be flash memory embedded within the host, such as in the form of a solid state disk (SSD) drive installed in a personal computer. Alternatively, the memory system 102 may be in the form of a card that is removably connected to the host through mating parts 104 and 106 of a mechanical and electrical connector as illustrated in FIG. 1. A flash memory configured for use as an internal or embedded SSD drive may look similar to the schematic of FIG. 1, with the primary difference being the location of the memory system 102 internal to the host. SSD drives may be in the form of discrete modules that are drop-in replacements for rotating magnetic disk drives.

One example of a commercially available SSD drive is a 32 gigabyte SSD produced by SanDisk Corporation. Examples of commercially available removable flash memory cards include the CompactFlash (CF), the MultiMediaCard (MMC), Secure Digital (SD), miniSD, Memory Stick, and TransFlash cards. Although each of these cards has a unique mechanical and/or electrical interface according to its standardized specifications, the flash memory system included in each is similar. These cards are all available from SanDisk Corporation, assignee of the present application. SanDisk also provides a line of flash drives under its Cruzer trademark, which are hand held memory systems in small packages that have a Universal Serial Bus (USB) plug for connecting with a host by plugging into the host's USB receptacle. Each of these memory cards and flash drives includes controllers that interface with the host and control operation of the flash memory within them.

Host systems that may use SSDs, memory cards and flash drives are many and varied. They include personal computers (PCs), such as desktop or laptop and other portable computers, cellular telephones, personal digital assistants (PDAs), digital still cameras, digital movie cameras and portable audio players. For portable memory card applications, a host may include a built-in receptacle for one or more types of memory cards or flash drives, or a host may require adapters into which a memory card is plugged. The memory system usually contains its own memory controller and drivers but there are also some memory-only systems that are instead controlled by software executed by the host to which the memory is connected. In some memory systems containing the controller, especially those embedded within a host, the memory, controller and drivers are often formed on a single integrated circuit chip.

The host system 100 of FIG. 1 may be viewed as having two major parts, insofar as the memory system 102 is concerned, made up of a combination of circuitry and software. They are an applications portion 108 and a driver portion 110 that interfaces with the memory system 102. In a PC, for example, the applications portion 110 can include a processor 112 running word processing, graphics, control or other popular application software, as well as the file system 114 for managing data on the host 100. In a camera, cellular telephone or other host system that is primarily dedicated to performing a single set of functions, the applications portion 108 includes the software that operates the camera to take and store pictures, the cellular telephone to make and receive calls, and the like.

The memory system 102 of FIG. 1 may include non-volatile memory, such as a multi-bank flash memory 116, and a system controller 118 that both interfaces with the host 100 to which the memory system 102 is connected for passing data back and forth and controls the memory 116. The system controller 118 may convert between logical addresses of data used by the host 100 and physical addresses of the multi-bank flash memory 116 during data programming and reading. The multi-bank flash memory 116 may include any number of memory banks 120 and four memory banks are shown in FIG. 1 simply by way of illustration. Functionally, the system controller 118 may include a front end 122 that interfaces with the host system, controller logic 124 for coordinating operation of the memory 116, flash management logic 126 for internal memory management operations such as system initiation, writing data within a block, bad block management and handling block linkage information, as well as one or more flash interface modules (FIMs) 128 to provide a communication interface between the controller with the flash memory 116.

Figure 2:
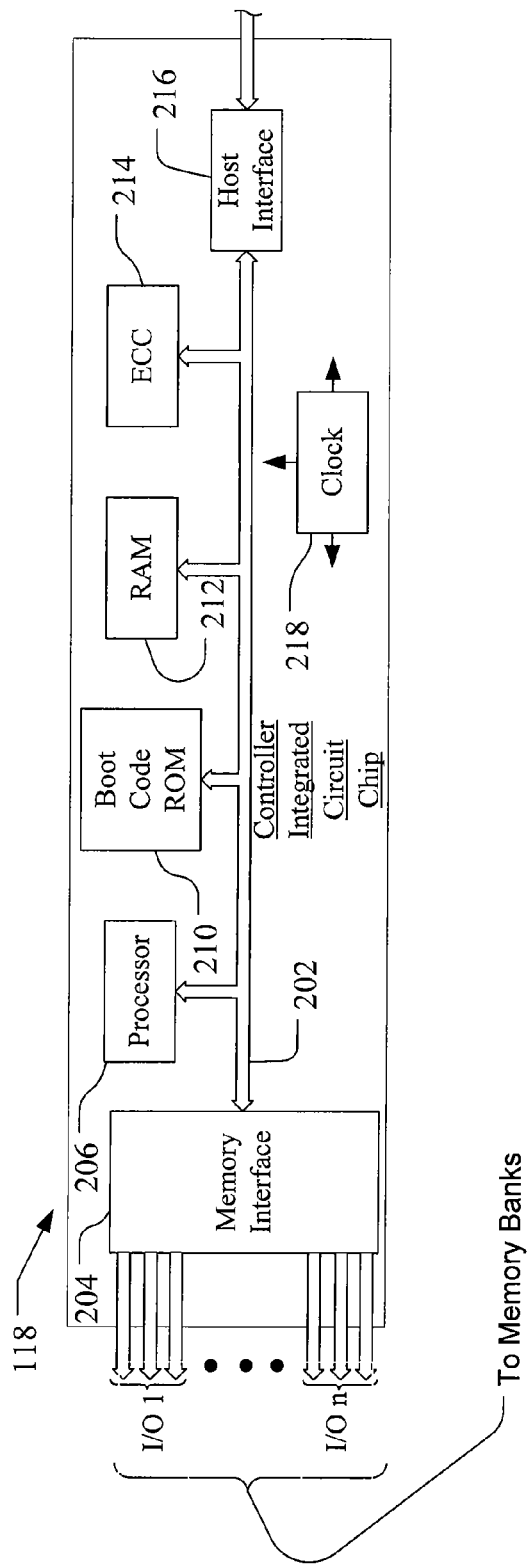
FIG. 2 is an example block diagram of an example flash memory system controller for use in the multi-bank non-volatile memory of FIG. 1.

The system controller 118 and may be implemented on a single integrated circuit chip, such as an application specific integrated circuit (ASIC) such as shown in FIG. 2. The processor 206 of the system controller 118 may be configured as a multi-thread processor capable of communicating separately with each of the respective memory banks 120 via a memory interface 204 having I/O ports for each of the respective banks 120 in the multi-bank flash memory 116. The system controller 118 may include an internal clock 218. The processor 206 communicates with an error correction code (ECC) module 214, a RAM buffer 212, a host interface 216, and boot code ROM 210 via an internal data bus 202.

Figure 3:
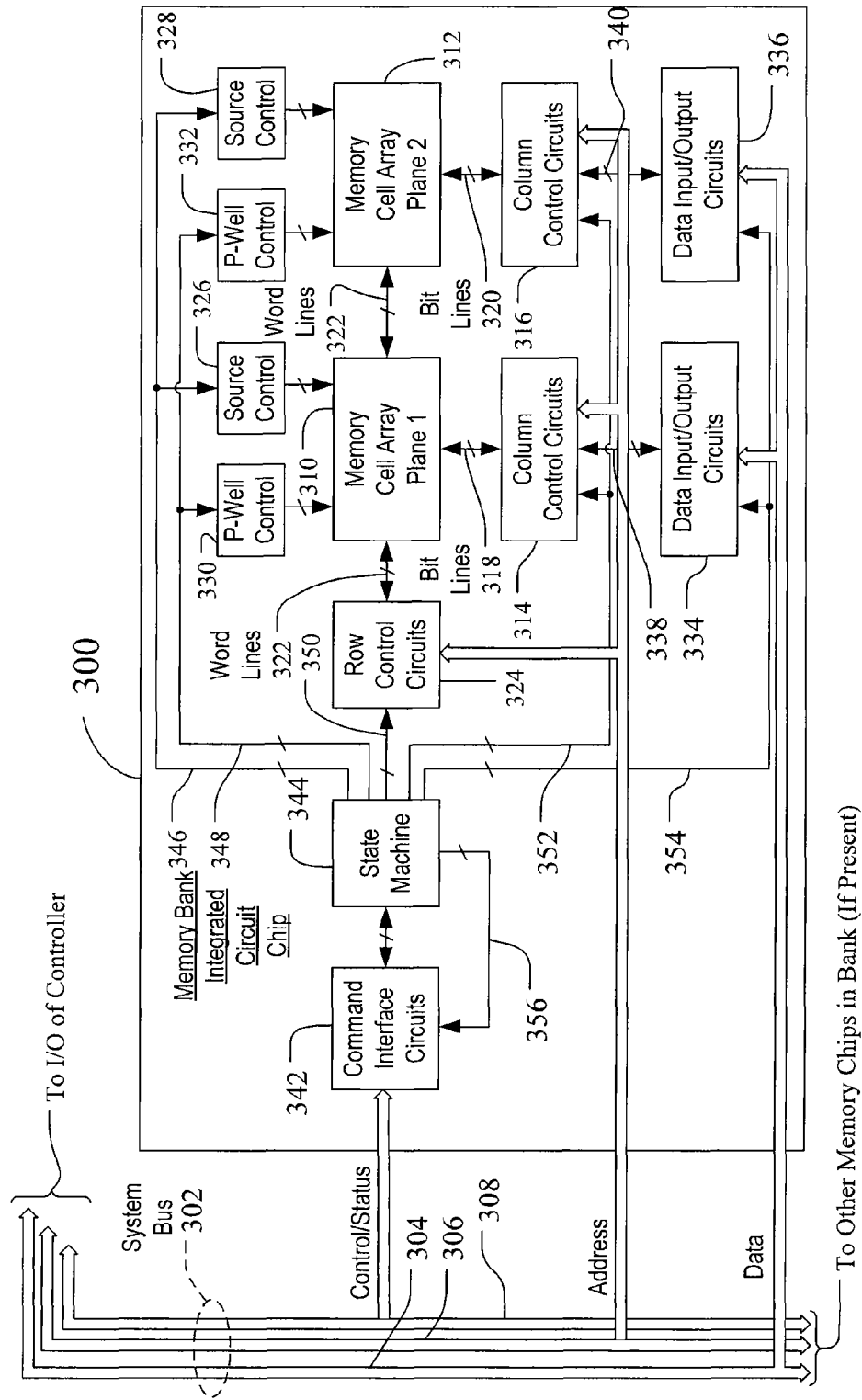
FIG. 3 is an example one flash memory bank suitable as one of the flash memory banks illustrated in FIG. 1.

Each bank 120 in the multi-bank flash memory 116 may consist of one or more integrated circuit chips, where each chip may contain an array of memory cells organized into multiple planes. An illustration of a memory bank 300 on a single chip is shown in FIG. 3. The memory bank 300 of FIG. 3 shows such planes 310 and 312 for simplicity but a greater number of planes, such as four or eight planes, may instead be used. Alternatively, the memory cell array of a memory bank may not be divided into planes. When so divided, however, each plane has its own column control circuits 314 and 316 that are operable independently of each other. The circuits 314 and 316 receive addresses of their respective memory cell array from the address portion 306 of the system bus 302, and decode them to address a specific one or more of respective bit lines 318 and 320. The word lines 322 are addressed through row control circuits 324 in response to addresses received on the address bus 19. Source voltage control circuits 326 and 328 are also connected with the respective planes, as are p-well voltage control circuits 330 and 332. If the bank 300 is in the form of a memory chip with a single array of memory cells, and if two or more such chips exist in the system, the array of each chip may be operated similarly to a plane within the multi-plane chip described above.

Data are transferred into and out of the planes 310 and 312 through respective data input/output circuits 334 and 336 that are connected with the data portion 304 of the system bus 302. The circuits 334 and 336 provide for both programming data into the memory cells and for reading data from the memory cells of their respective planes, through lines 338 and 340 connected to the planes through respective column control circuits 314 and 316.

Each memory chip in each bank 120 contains some controlling circuitry that executes commands from the controller 118 to perform such functions. Interface circuits 342 are connected to the control and status portion 308 of the system bus 302. Commands from the controller 118 are provided to a state machine 344 that then provides specific control of other circuits in order to execute these commands. Control lines 346-354 connect the state machine 344 with these other circuits as shown in FIG. 3. Status information from the state machine 344 is communicated over lines 356 to the interface 342 for transmission to the controller 118 over the bus portion 308.

A NAND architecture of the memory cell arrays 310 and 312 is discussed below, although other non-volatile memory architectures or technologies, alone or combination, such as NOR, can be used instead. An example NAND array is illustrated by the circuit diagram of FIG. 4, which is a portion of the memory cell array 310 of the memory bank 300 of FIG. 3. A large number of global bit lines are provided, only four such lines 402-408 being shown in FIG. 4 for simplicity of explanation. A number of series connected memory cell strings 410-424 are connected between one of these bit lines and a reference potential. Using the memory cell string 414 as representative, a plurality of charge storage memory cells 426-432 are connected in series with select transistors 434 and 436 at either end of the string. When the select transistors of a string are rendered conductive, the string is connected between its bit line and the reference potential. One memory cell within that string is then programmed or read at a time.

Figure 4:
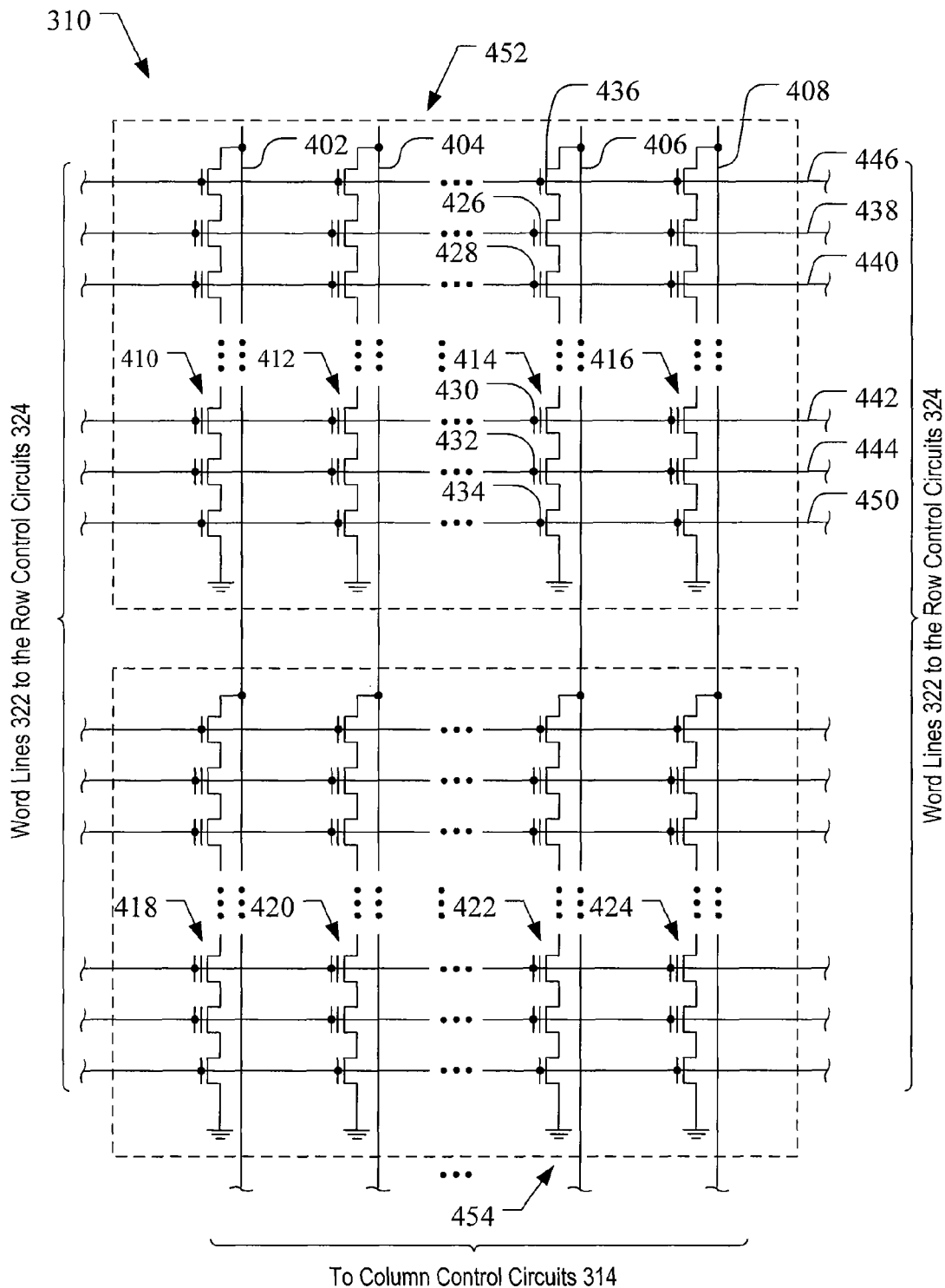
FIG. 4 is a representative circuit diagram of a memory cell array that may be used in the memory bank of FIG. 3.

Word lines 438-444 of FIG. 4 individually extend across the charge storage element of one memory cell in each of a number of strings of memory cells, and gates 446 and 450 control the states of the select transistors at each end of the strings. The memory cell strings that share common word and control gate lines 438-450 are made to form a block 452 of memory cells that are erased together. This block of cells contains the minimum number of cells that are physically erasable at one time. One row of memory cells, those along one of the word lines 438-444, are programmed at a time. Typically, the rows of a NAND array are programmed in a prescribed order, in this case beginning with the row along the word line 444 closest to the end of the strings connected to ground or another common potential. The row of memory cells along the word line 442 is programmed next, and so on, throughout the block 452. The row along the word line 438 is programmed last.

A second block 454 is similar, its strings of memory cells being connected to the same global bit lines as the strings in the first block 452 but having a different set of word and control gate lines. The word and control gate lines are driven to their proper operating voltages by the row control circuits 324. If there is more than one plane in the system, such as planes 1 and 2 of FIG. 3, one memory architecture uses common word lines extending between them. There can alternatively be more than two planes that share common word lines. In other memory architectures, the word lines of individual planes are separately driven.

The memory cells may be operated to store two levels of charge so that a single bit of data is stored in each cell. This is typically referred to as a binary or single level cell (SLC) memory. Alternatively, the memory cells may be operated to store more than two detectable levels of charge in each charge storage element or region, thereby to store more than one bit of data in each. This latter configuration is referred to as multi level cell (MLC) memory. Both types of memory cells may be used in a memory, for example binary flash memory cells may be used for caching data and MLC memory may be used for longer term storage. The charge storage elements of the memory cells are most commonly conductive floating gates but may alternatively be non-conductive dielectric charge trapping material.

Figure 5:
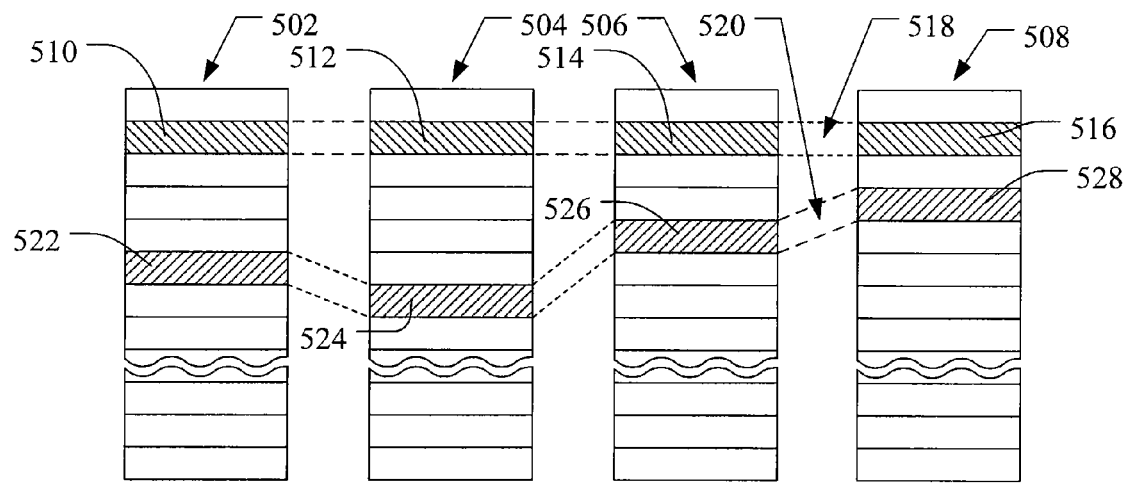
FIG. 5 illustrates an example physical memory organization of the memory bank of FIG. 3.

FIG. 5 conceptually illustrates an organization of one bank 120 of the multi-bank flash memory 116 (FIG. 1) that is used as an example in further descriptions below. Four planes 502-508 of memory cells may be on a single integrated memory cell chip, on two chips (two of the planes on each chip) or on four separate chips. The specific arrangement is not important to the discussion below. Of course, other numbers of planes, such as 1, 2, 8, 16 or more may exist in a system. The planes are individually divided into blocks of memory cells shown in FIG. 5 by rectangles, such as blocks 510, 512, 514 and 516, located in respective planes 502-508. There can be hundreds or thousands of blocks in each plane.

As mentioned above, the block of memory cells is the unit of erase, the smallest number of memory cells that are physically erasable together. For increased parallelism, however, the blocks are operated in larger metablock units. One block from each plane is logically linked together to form a metablock. The four blocks 510-516 are shown to form one metablock 518. All of the cells within a metablock are typically erased together. The blocks used to form a metablock need not be restricted to the same relative locations within their respective planes, as is shown in a second metablock 520 made up of blocks 522-528. Although it is usually preferable to extend the metablocks across all of the planes, for high system performance, the memory system can be operated with the ability to dynamically form metablocks of any or all of one, two or three blocks in different planes. This allows the size of the metablock to be more closely matched with the amount of data available for storage in one programming operation.

Figure 6:
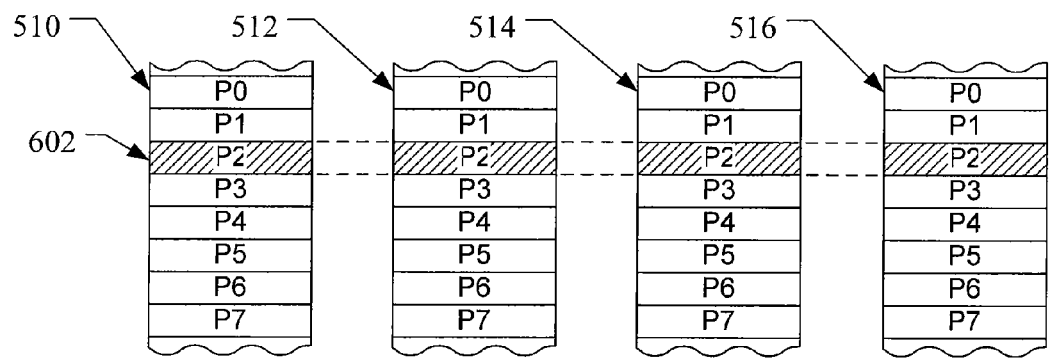
FIG. 6 shows an expanded view of a portion of the physical memory of FIG. 5.

The individual blocks are in turn divided for operational purposes into pages of memory cells, as illustrated in FIG. 6. The memory cells of each of the blocks 510-516, for example, are each divided into eight pages P0-P7. Alternatively, there may be 16, 32 or more pages of memory cells within each block. The page is the unit of data programming within a block, containing the minimum amount of data that are programmed or read at one time. In the NAND architecture of FIG. 3, a page is formed of memory cells along a word line within a block. However, in order to increase the memory system operational parallelism, such pages within two or more blocks may be logically linked into metapages. A metapage 602 is illustrated in FIG. 6, being formed of one physical page from each of the four blocks 510-516. The metapage 602, for example, includes the page P2 in each of the four blocks but the pages of a metapage need not necessarily have the same relative position within each of the blocks. Within a bank, a metapage is the maximum unit of programming.

Figure 7:
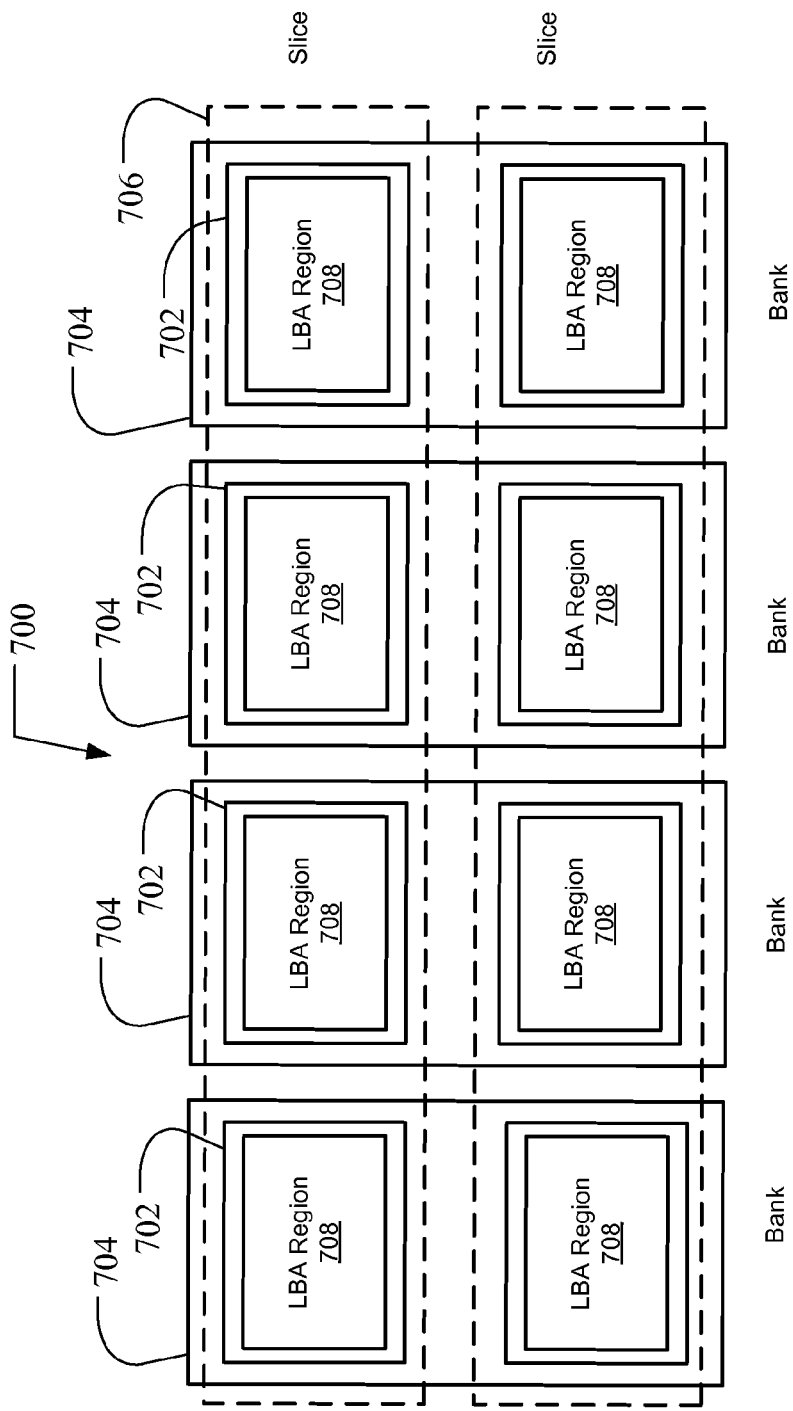
FIG. 7 illustrates an embodiment of the multi-bank memory of FIG. 1 having subarrays organized in banks and slices.

As noted above, FIGS. 5-6 illustrate one embodiment of the memory cell arrangement that may exist in one memory bank 120 of the multi-bank memory 116. In one embodiment, regardless of individual memory cell configuration for each bank 120, the memory is broken up into a plurality of physical subarrays that are each mapped to a unique set of host LBA addresses referred to herein as LBA regions. One arrangement of physical subarrays 702 in a multi-bank memory 700 is illustrated in FIG. 7. Each bank 704 may have one or more subarrays 702 where each subarray 702 is associated with a respective LBA region 708 made up of a fixed address range of host LBA addresses that differs from every other LBA region 708 in the multi-bank memory 700. Each physical subarray 702 is capable of operating independently of the any of the other physical subarrays 702 whether located in the same bank 704 or in a different bank. A subarray 702 may consist of multiple blocks that are arranged on one or more separate memory chips or dies within a bank 704. Four banks 704 are illustrated in FIG. 7, where each bank 704 includes two subarrays 702 and each subarray 702 in a bank is organized into a slice 706 with correspondingly positioned subarrays in adjacent banks. Although a 4×2 arrangement of LBA subarrays is shown, with four banks 704 in the "x" direction and each bank having two slices 706 in the "y" direction, any number of banks and slices may be implemented. For example, a one-dimensional arrangement may be used where there are multiple banks, but only one subarray per bank so that there is a single slice, or where there is only a single bank but with multiple subarrays. Alternatively, any of a number of two-dimensional arrays having a "y" dimension of two or more slices or an "x" dimension of two or more banks may be implemented.

Regardless of the arrangement of subarrays, each subarray is pre-assigned a fixed logical region of host LBA addresses such that host data associated with those addresses will be handled exclusively by that LBA subarray. The pre-assigned mapping of the LBA addresses of host data to subarrays may be configured in the memory system such that three objectives are balanced: first, that the number of LBA subarrays 702 mapped to a sequence of contiguous addresses in host LBA address space is high to maximize parallelism of writing sequential data to physical subarrays; second, that the length of the sequence of contiguous addresses in individual LBA subarrays mapped to a sequence of contiguous addresses in host LBA address space is high to maximize the writing of data with sequential addresses in physical subarrays; and third that the number of LBA subarrays mapped to a sequence of random addresses in a restricted range within host LBA address space should be high to maximize the parallelism of handling random data in physical subarrays. In one embodiment, the number of banks 704 may be set by the parallelism that is necessary for the memory system to achieve a specified sequential write speed. The number of slices 706 may be set by the number of memory subarrays within a bank that should perform background operations concurrently with host data write operations to the bank.

Figure 8:
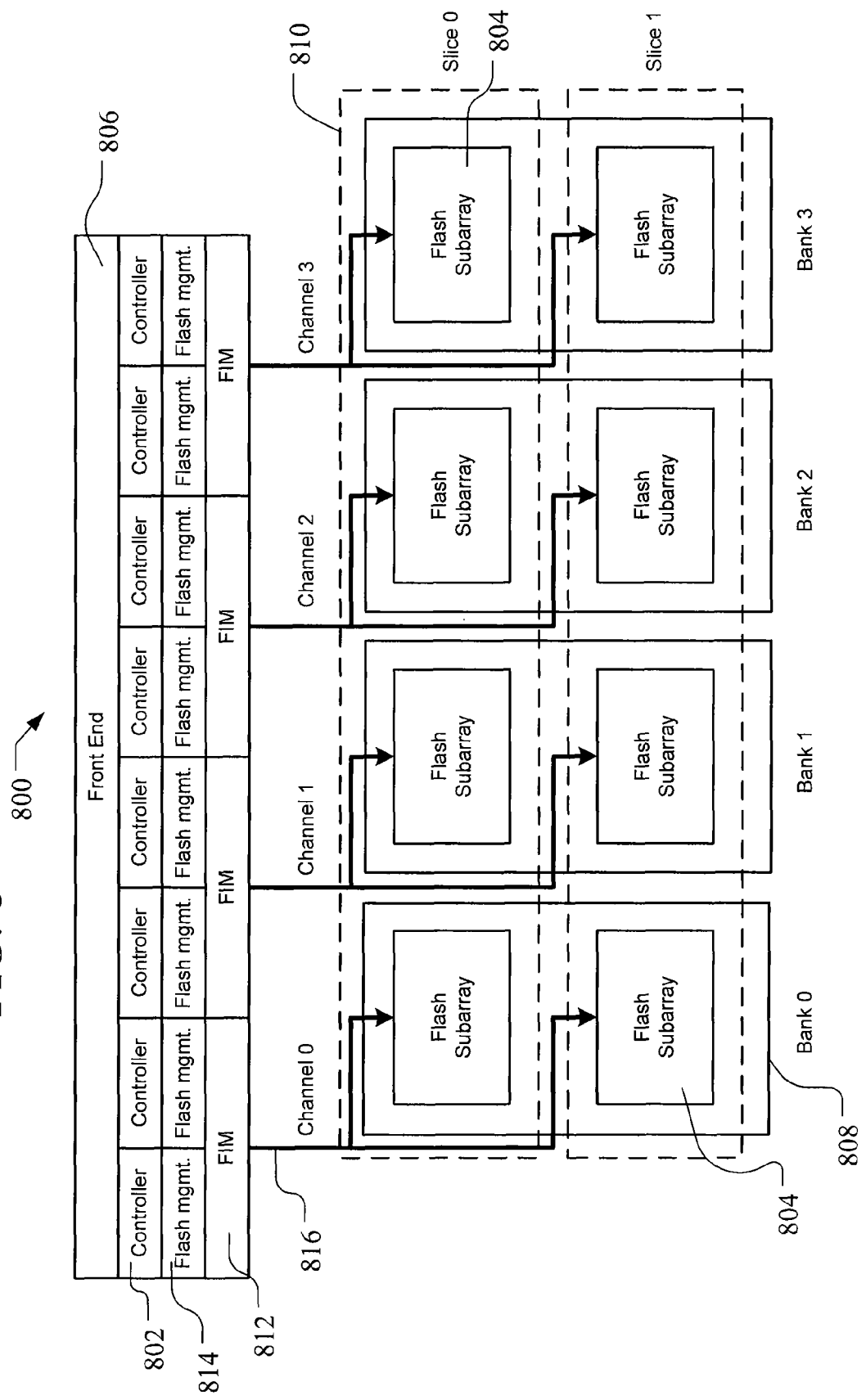
FIG. 8 illustrates an embodiment of the memory system of FIG. 1 with a controller ASIC and a multi-bank memory having a 4×2 set of subarrays.

In order to achieve independent operation of each subarray with respect to each other subarray, each subarray may be associated with a separate controller. The controller may be a single hardware controller on a die separate from that of each of the banks 120, as illustrated in FIGS. 1-2, that operates a separate instance of a firmware for each subarray. FIG. 8 illustrates a functional block diagram 800 of the system controller circuit 118 of FIGS. 1-2 arranged with multiple firmware controllers 802, where each instance of a firmware controller 802 is dedicated to a respective one of the flash subarrays 804 in the 4×2 arrangement. The firmware controllers 802 may be any of a number of known firmware controllers including a firmware controller configured with storage address remapping (STAR) functionality. More detail on STAR functionality may be found in U.S. Pub. No. 2008/0307192 A1 (U.S. application Ser. No. 12/036,014) the entirety of which is incorporated herein by reference.

The physical flash subarrays 804 of FIG. 8 correspond to the logical, or LBA, subarrays of FIG. 7, and the arrangement of banks 808 and slices 810 correspond to their counterparts in FIG. 7. In one implementation, the maximum unit of concurrent programming in a single flash subarray 804 is a physical metapage. A unit of contiguous addresses in host LBA address space with the same length as a physical metapage is termed a host LBA metapage herein.

As shown in FIG. 8, the system controller circuit 800 may be arranged as a front end portion 806 that implements a host interface, for example a serial ATA interface, where RAM, such as DRAM is used to cache incoming host data. The processor 206 (FIG. 2) in the memory system is also configured to execute firmware or software to direct data in predetermined host LBA ranges to the firmware controller 802 of the appropriate subarray 804. Each autonomous instance of a firmware controller 802 is also associated with a set of flash management routines 814. Examples of flash management routines 814 include system initiation, writing data within a block, bad block management and handling block linkage information. One or more flash interface modules (FIMs) 812 provide a communication interface between each controller 802 and its respective flash subarray 804 in memory. The flash management routines may be handled by each instance of firmware controller 802, by processors or logic in each bank 808, or by a combination of the two.

As discussed herein, an operation such as a flash management routine or a garbage collection or block reclaim operation may be executed in one subarray, independent of each other subarray, and concurrently with a host write operation in a different subarray of the same bank. Garbage collection may consist of copying remaining valid data from a previously written block to a new block so that the previously written block may be recycled for later use. One type of garbage collection includes garbage collection necessitated by a host command where valid data from a block that has had some data made obsolete is copied to another block and consolidated with updated data corresponding to the data made obsolete by the host command in order to keep certain groups of logically addresses together. Another type of garbage collection includes a block reclaim or flushing operation where, separate from a specific host operation, valid data is relocated or flushed to a relocation block that is filled with other valid relocated data. The flushed data that is placed in the relocation block is not purposely consolidated with valid data from the original block and is instead simply re-mapped so that the number of update blocks may be minimized.

In the embodiment of FIG. 8, each bank 808 is shown as having a single channel 816 for routing data from the controller circuit 808, such that a single flash interface module (FIM) 812 for physically and logically connecting the subarrays 804 to the controller circuit 800 is used per bank 808. The number of FIMs 812 and the number of channels 816 may vary in different implementations, such that each sub-array may have a dedicated channel and corresponding dedicated FIM in other implementations. Again, for consistency in illustration the multibank flash memory is also illustrated as having two slices 810. Any number of banks and subarray may be implemented in other embodiments.

Figure 9:
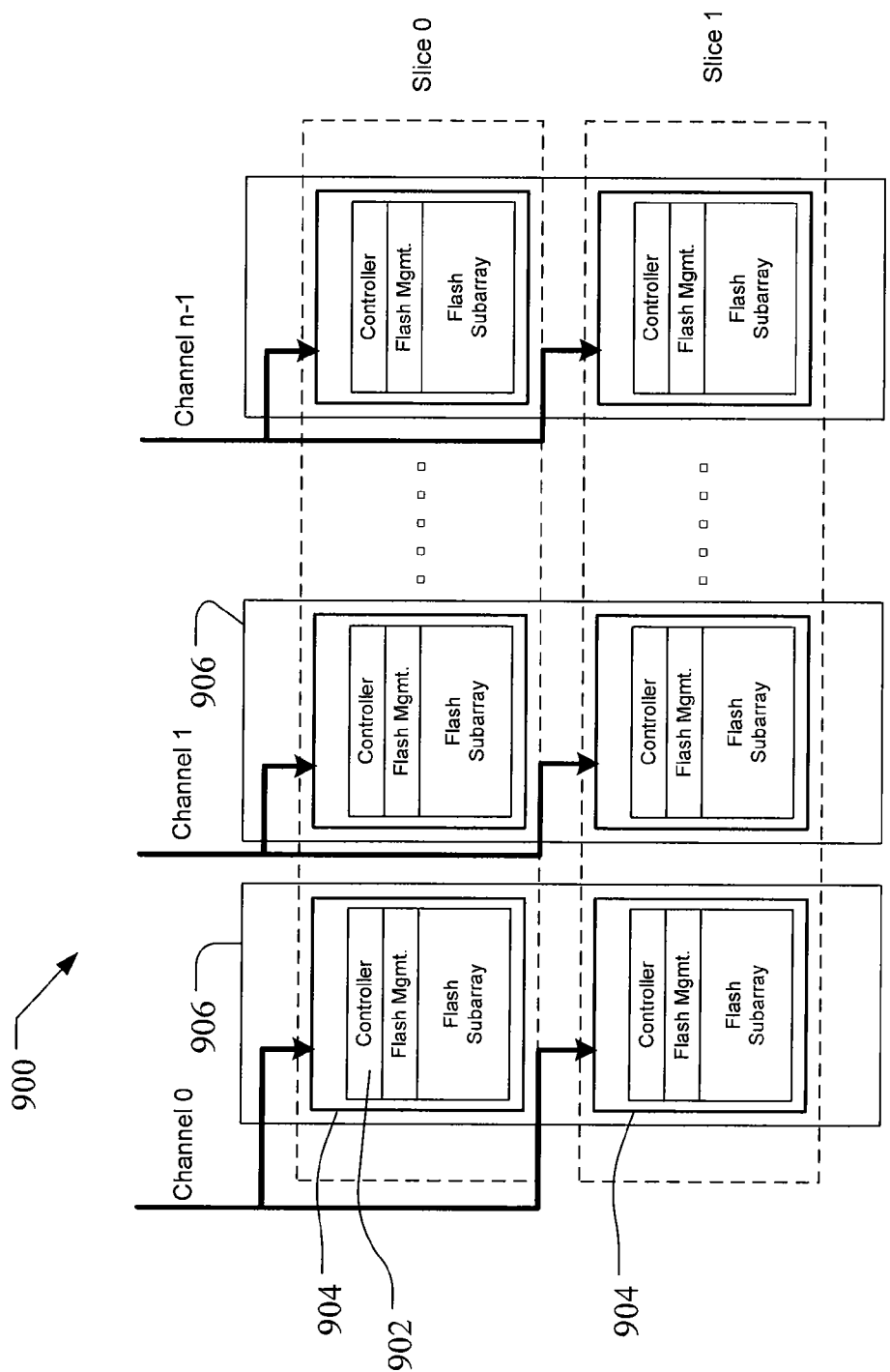
FIG. 9 illustrates an alternative multi-bank memory arrangement having controller functionality included in each bank of the multi-bank memory.

Alternatively, instead of discrete controller circuit 800 and banks 808 of FIG. 8, the memory system 102 may include separate hardware controllers in each of the banks. As illustrated in FIG. 9, the memory system 900 may include banks 906 that include separate controller hardware 902 that is fabricated on each die that makes up the memory system. Alternatively, a separate hardware controller may be packaged together with one or more flash memory die. Although certain functionality is still located in a system controller (not shown) similar to that of FIG. 8, separate hardware controllers 902 are included with each flash subarray 904 to handle the local read, write and flash management routines for the flash subarray 904 associated with the controller 902.

Regardless of the particular distribution of controller hardware, firmware in the above alternative configurations of the memory system, each of the subarrays is assigned a fixed group of host LBA addresses. Also, each subarray 804, 904 is operated by a controller 802, 902, whether by a discrete hardware controller 902 or an instance of a firmware controller that is sharing a processor with other instances of the firmware controller. Thus, each subarray 804 may be independently operated with respect to the other subarrays 804. A central routing function of incoming data is handled at the front end 806 to direct data received from the host to the correct subarray 804 and controller 802 pairing based on the host LBA addresses of the incoming data.

Referring again to FIGS. 1-2, one example front end 122 is seen in FIG. 1 where the host interface in the front end 122 may include any of a number of known interfaces, such as a serial ATA interface (SATA). The front end 122 may handle caching of data from the host 100 with a volatile or non-volatile cache memory. RAM 212, which may be DRAM, is shown in FIG. 2. A processor 206 in the front end 122 manages separation and routing of data from the host to the appropriate subarray based on the host LBA addresses that have been preassigned to each subarray. In implementations where the processor 206 is separate from the memory die as in FIG. 8, the processor 206 may also be used to execute the controller firmware 802. A mapping of the preassigned host LBA addresses and subarrays may be maintained in a table and checked by the front end 122 against host LBA addresses of data arriving from the host or the mapping may be determined by the front end 122 executing an algorithm against the incoming data host LBA addresses to sort the data to the appropriate flash subarray. For example, sequential LBA addresses in the address space at the host interface may be interleaved in bursts amongst individual subarrays. In one implementation, if each burst contains 64 LBA addresses and there are 8 subarrays, address bits 0 to 5 may define an LBA within a page of a subarray and address bits 6 to 8 may define the subarray which should be addressed. The LBA address received at the host interface may be passed directly to the subarray addressed by bits 6 to 8, after bits 6 to 8 have been removed from it.

In addition to the routing of the incoming data to the subarray associated with the host LBA address of the data, the front end 122 is arranged to provide centralized management of the various controllers so that concurrent foreground write operations and background operations such as reclaim (garbage collection) may be coordinated amongst the controllers. The front end 122 may be logic in the same ASIC 208 that houses the controller functions, such as shown in FIG. 2, a collection of one or more discrete circuits, or a combination of the two.

Figure 10:
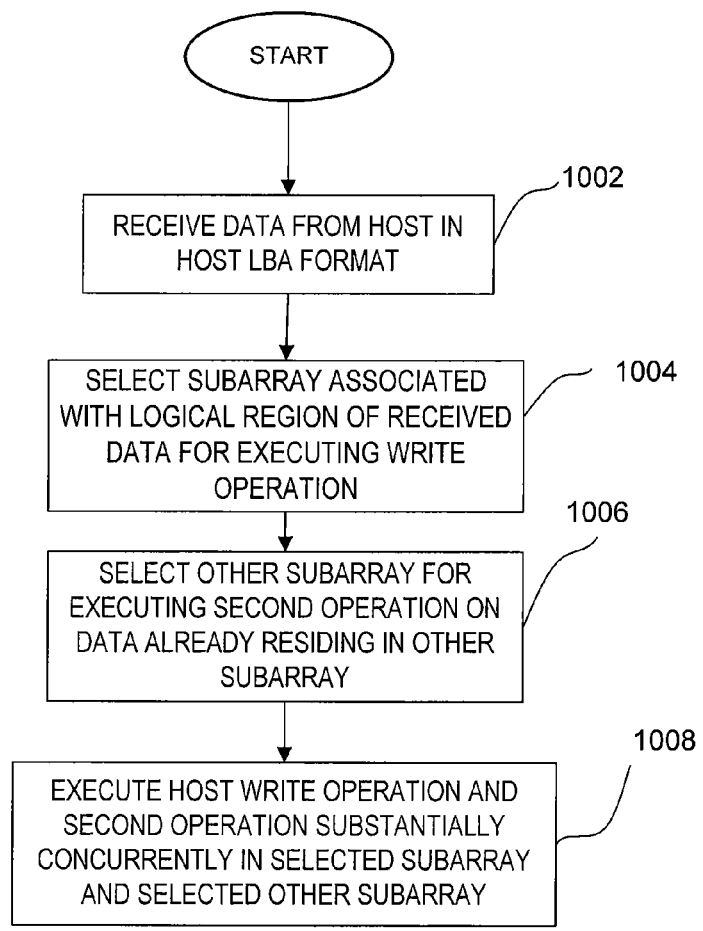
FIG. 10 is a flow diagram illustrating an embodiment of implementing concurrent foreground and background operations in a multi-bank memory.

Utilizing any of the various memory system configurations disclosed above, where each subarray is independently operable relative to the other subarrays, concurrent write operations and other operations may be supported in multiple subarrays. In accordance with one embodiment, as illustrated in FIG. 10, a method of managing a concurrent host data write operation and a second operation in a multi-bank memory having one or more independently operable subarrays 804 in each bank 810 includes receiving host data from a host file system 10 in the host LBA format (at 1002). As the host data is received, the front end 806 selects the controller 802 and subarray 804 that are associated with the host LBA address for the received data (at 1004) by either comparing LBA addresses to tables of LBA address to subarray mappings or applying an algorithm to the LBA addresses to achieve the proper subarray mapping. The front end 806 then selects at least one other subarray 804 in the multibank memory for executing a second operation, such as a garbage collection operation (at 1006). In one embodiment, the selection is for a second subarray in the same bank. In other embodiments, the selected other subarray may be in the same or a different bank than the first subarray.

After making the selections, the processor 206 associated with the front end directs the respective controllers 802 for the selected subarrays 804 to concurrently execute the write (foreground) and second (background) operations (at 1008). The background operation executed concurrently in one subarray while another subarray executes a host write operation need not be a garbage collection operation, but may be a read or a copy operation. As used herein, a foreground operation refers to any activity that is a direct consequence of a host write command. A foreground operation may include garbage collection if garbage collection is necessary to carry out a pending write command. In contrast, a background operation refers to activities that take place that are not a direct consequence of a host write command. For example, background operations include read, write, and preemptive garbage collection or block reclaim operations. The foreground and background garbage collection operations are the same except for the scheduling aspect.

Figure 11:
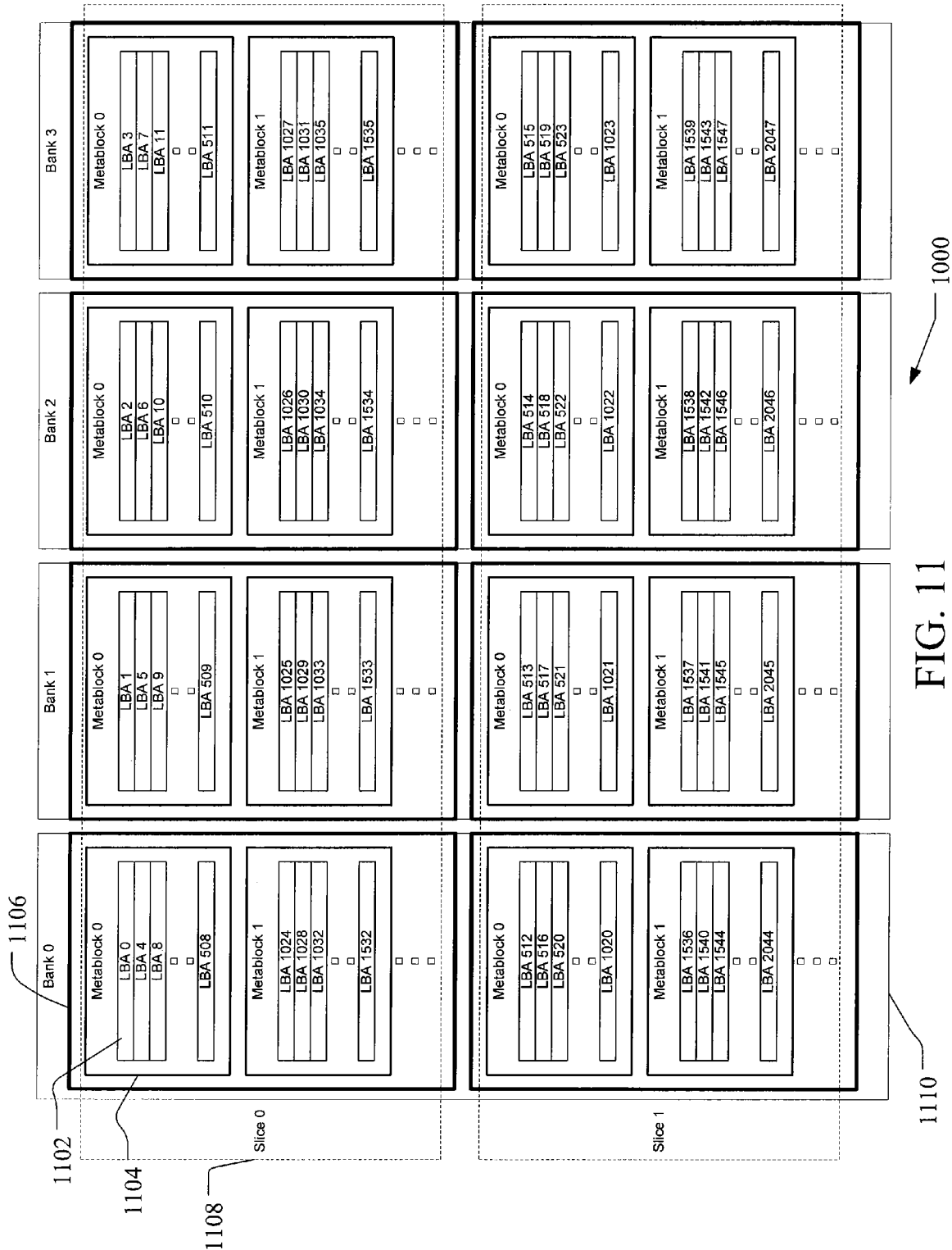
FIG. 11 illustrates an embodiment of how the physical subarrays in a multi-bank memory may be pre-assigned fixed host LBA addresses that interleave host LBA addresses on a metapage and a metablock level.

Referring now to FIGS. 11-12, the pre-assigned mapping of host LBA addresses to subarrays by the front end in memory system 102 distributes all host data writes such that host LBA addresses are interleaved, by metapage 1102, within a metablock 1104 of a subarray 1106 and between each subarray 1106 in a slice 1108. The example multi-bank memory 1000 of FIG. 11 shows a two-dimensional arrangement of four banks 1110 and two subarrays 1106 per bank 1110. Each subarray 1106 includes at least two metablocks 1104 having a plurality of metapages 1102. For purposes of this example, each subarray 1106 is shown as having a minimum unit of concurrent erasure of a physical metablock 1104 comprising 128 contiguous physical metapages 1102. Because of the interleaving of data of different host LBA metapages described below, the contiguous physical metapages are shown in FIG. 11 with sequential, but discontiguous host LBA metapage designations. The fixed, pre-assigned host LBA addresses assigned to each subarray 1106 are shown in FIG. 11 by host LBA metapage number where host LBA metapages are written to the subarrays 1106 one metapage 1102 at a time. The subarrays 1106 are predesignated such that sequentially numbered host LBA metapages 1102 are striped across all of the banks 1110 rather than sequentially written in continuous host LBA order to a metablock 1104 in a single bank 1110 before proceeding to a next metablock 1104. Thus, each metablock 1104 of a subarray 1106 will have a sequential, but discontinuous, group of host LBA metapages 1102 assigned.

A table 1200 illustrating how the host LBA metapages are pre-assigned to the metablocks 1104 in each subarray 1106 of FIG. 11 is shown in FIG. 12. Each possible host LBA metapage 1102 is listed in column 1202 in order as preassigned to a specific location in the memory. An LBA subarray address 1204 indexes the bank 1110, slice 1108, metablock 1104 and metapage 1102 in the LBA subarray 1106 that the host LBA metapage is assigned to. Sequentially numbered host LBA metapages 0-3 are assigned to a first metapage (metapage 0) in a first metablock (metablock 0) of a first slice (slice 0) of each of the banks (0-3) before a second consecutive metapage in any of the banks receives another host LBA metapage. In other words, sequentially numbered host LBA metapages are "striped" across all the banks so that looking at sequentially ordered metapages in a particular metablock shows sequential, but discontinuous host LBA metapage addresses. In the example of a four bank memory shown in FIGS. 11-12, the next sequential metapage in a given metablock of a subarray is assigned to data having a host LBA metapage address is N+4 greater than the previous host LBA address in the metablock. This arrangement of assigning contiguously addressed host LBA metapages to the physical metapages of subarrays in different banks creates an x-dimension interleaving (e.g., between banks) so that parallelism is optimized for programming (writing) host data associated with sequential host LBA addresses.

In addition to the interleaving of host LBA metapages in the memory, the host LBA addresses are assigned to subarrays 1106 such that there is y-dimension (e.g., between subarrays in different slices in a bank) interleaving by metablock as well. For example, referring again to FIG. 11, the host LBA metapage address "LBA 511" completes the last metapage of bank 3, metablock 0. Instead of continuing the assignment of host LBA addresses to the next available metablock 1104 in the first subarray of the first bank (i.e., starting with bank 0/metablock 1/metapage 0 in the example of FIGS. 11-12), the next host LBA metapage (LBA 512) is assigned to the first metablock in the next subarray in the bank, skipping over the next metablock in the first subarray. The assignment of host LBA metapage addresses within the first metablock of the second subarray in each of the banks metablock then proceeds in the same manner as noted above for the first metablock in the first subarrays of each of the banks, where host LBA metapage addresses are striped in host LBA metapage address order across each of the banks to achieve the metapage interleaving.

After completing the pre-assigned host LBA addresses continue on back in the second metablock (metablock 1, slice 0) of the first subarrays and then finally jump to the second metablock of the second subarrays (metablock 1, slice 1) as illustrated. The x-dimension interleaving assists with maximizing parallelism when long runs of consecutive host LBA addresses are received. The y-dimension interleaving may assist in balancing workloads for both background and foreground operations across the slices within a bank. Thus, y-dimension, or block-level, interleaving can also help spread out concentrations of activity that may occur in LBA addresses to different blocks.

The metablock interleaving of pre-assigned host LBA addresses noted above may be adapted to any of a number of arrangements for subarrays. The example of FIGS. 11-12 shows a 4×2 arrangement of subarrays with interleaving only shown between two of what may be many metablocks per subarray. The interleaving in a subarray may be sequential or non-sequential. For example, if each of the subarrays included three metablocks (each subarray having a metablock 0, 1 and 2), then the y-dimension interleaving may be a simple linear progression alternating the host LBA metapage interleaved address assignments between subarrays in metablock order. Alternatively, the metablock order may be 0, 2, 1 for further diversification. Any number of metablock selection schemes may be implemented. The metablock interleaving may be accomplished in any arrangement of subarrays, even a single slice arrangement such as a 4×1 arrangement if the total number of metablocks in the "vertical" direction is greater than two. Thus, a 4×1 subarray configuration where the each subarray in each bank has three or more metablocks, or a 4×3 subarray configuration where each subarray only has a single metablock, can be arranged with the y-dimension interleaving described above. In other embodiments y-dimension interleaving may be omitted such that each slice is configured with only metapage interleaving in the x-direction.

As noted previously, a memory system such as memory system 102 with a multibank flash memory 116 having a 4×2 configuration of subarrays 804, 904 arranged as illustrated in FIG. 8 or 9, supports concurrent foreground and background operations. The 4×2 configuration is only one example. Other configurations of subarrays may be implemented, such that any B×S arrangement, where B is the number of banks and S is the number of slices (subarrays per bank) can be utilized. All of the subarrays may perform a foreground operation (such as writing host data to the flash memory) or a background operation (such as garbage collection activities to move remaining valid data from an old block to a new block and reclaim the old block) concurrently with the other subarrays because of the independent controller function dedicated to each subarray and because of the fixed and predetermined host LBA addresses assigned to each subarray.

Figure 13:
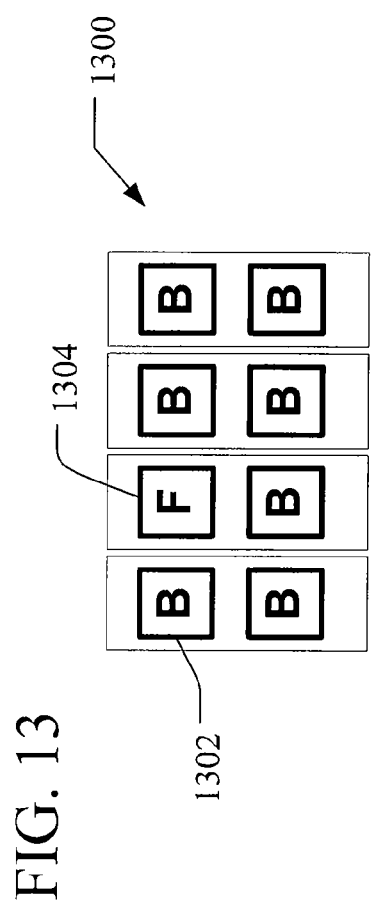
FIG. 13 is a state diagram showing distribution of foreground and background operations in subarrays according to one embodiment of a multi-bank write algorithm for use in the systems of FIGS. 10-12.
Figure 14:
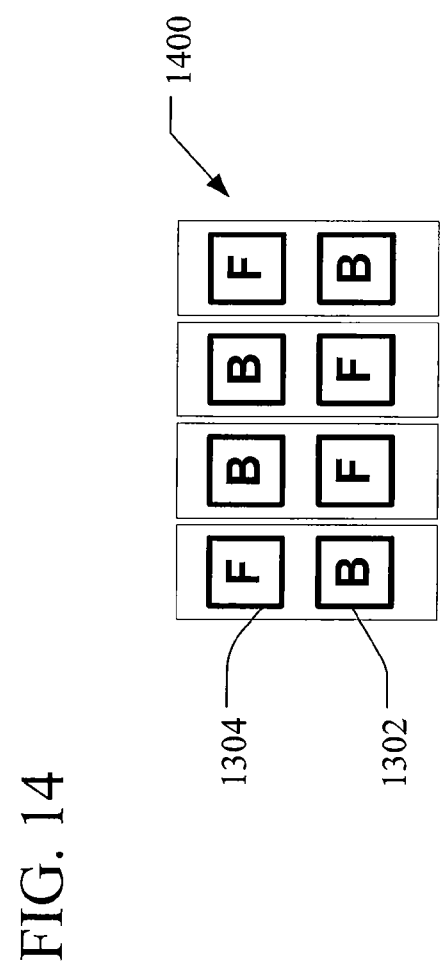
FIG. 14 is a state diagram showing distribution of foreground and background operations in subarrays according to a second embodiment.

Referring to the subarray diagrams 1300, 1400 of FIGS. 13-14, each illustrating a 4×2 array of subarrays, each subarray may be actively executing a background operation (identified with a "B") 1302 or a foreground operation (identified with an "F"). The example of FIG. 13 illustrates a possible mix of foreground and background operations where only a single foreground operation is carried out due to write cache limitations in the memory system, for example where a write cache for the memory system is disabled and the memory system only has a queue depth of 1. In contrast, FIG. 14 illustrates a memory system where a write cache is enabled and has a queue depth of 8 so that as many as one subarray per bank may concurrently perform a foreground (e.g. write operation). In either example, all of the subarrays not engaged in a write operation may concurrently perform background operations.

Although the memory system 102 has the capability of executing a background operation in each subarray that is not executing a foreground operation, there may be reasons to prevent background operations from taking place in certain subarrays. In one embodiment, it is contemplated that the memory system may have an activity limit. This activity limit may be based on power available to, or heat generated by, the memory system. Each foreground and background operation requires a certain amount of power in order to carry out an operation. In certain applications, the power supply may be physically limited such that there simply is not enough power available for concurrent operations in all the subarrays. Thus, while concurrent foreground and background operations may theoretically be executed in the same bank or multiple banks, there may be a practical limit to the number of operations that can actually occur because the power supply is unable to supply the needed power for all subarrays in the banks. Power supply concerns may be based on the fact that the memory system 102 is part of a battery-powered system where power conservation is at a premium. In alternate embodiments, the activity limit based on power concerns may be in effect at all times or just when the host device 100 to which the memory system 102 is connected is running on battery power. For instance, if the memory system is a solid state disk (SSD) and the host system is a laptop computer, the activity limit may only be necessary when the laptop is not connected to an AC power source. In yet other embodiments, the heat dissipation issues for the memory system may involve limiting the maximum activity level such that the front end will only permit a preset maximum number of subarrays to be simultaneously active.

Figure 15:
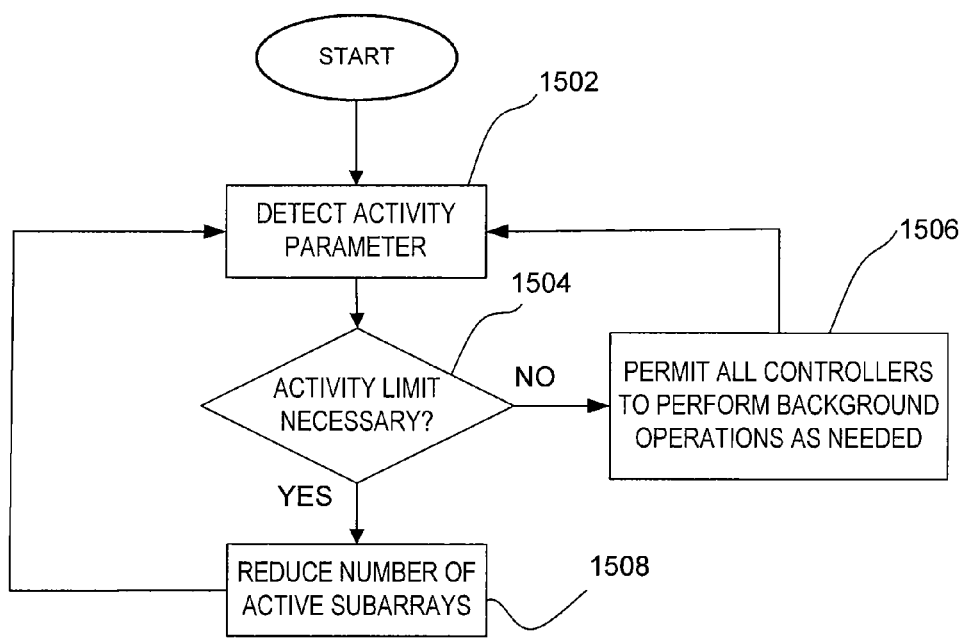
FIG. 15 is a flow diagram of one embodiment for implementing an activity limit for foreground and background activity in a multi-bank memory system.

Referring to FIG. 15, an example of how the front end 122, 806 of the memory system may track and control the number of concurrent operations are allowed to go forward in the memory system is illustrated. In one embodiment, the front end 122, 806 of the memory system schedules all activity in the various subarrays. The front end 122, 806 may do so by sending a command to each controller 802 that instructs the controller to continue to run a particular background operation in its respective subarray 804, such as when a background garbage collection or block reclaim is necessary. The command from the front end may act as a simple on or off, where the controller 802 receiving a command to perform a background operation will continue to execute the background operation in its respective subarray until the front end sends a follow-up command to stop. A preset activity limit may be based on a predetermined number of background operations less than the total number of subarrays in the memory system, a preset supply current limit, a preset power dissipation limit, or other parameter indicative of subarray activity. The front end may make this determination based on detecting one or more parameters relating to, for example, the power source currently supplying power to the memory system.

Initially, the front end determines if an activity limit is currently necessary by detecting an activity parameter (at 1502). The parameter may be a flag or bit that a host may send to the front end of the memory system to indicate whether a battery source is being used or a non-battery source. If the parameter indicates a non-battery source is in use, then the front end may permit all controllers to be active for background operations, or at least the maximum preset number based on previously determined device heat dissipation limits (at 1504). On the other hand, if the parameter indicates a battery source is in use then the front end may initiate a predetermined activity limit by reducing the number of active subarrays (at 1506).

The activity limit may be a preset limit stored in local memory in the front end 802 or may be supplied by the host. The processor 206 associated with the front end 806 may compare the activity threshold to information it receives from the controllers 802 regarding the currently level of activity in the memory system. When an activity limit is in effect, the number of foreground and background operations permitted is less than the total number of subarrays. The front end may implement the reduced activity level by simply permitting a reduced number of controllers allowed to perform operations. The front end may alternate which controllers it allows to perform background operations in a sequential order, giving each controller a set amount of time to perform its background activities, before turning off a controller and turning on another so that the total number of controller active at any given time is no more than the preset activity limit. Alternatively, the controllers for each subarray may provide information to the front end so that the front end can select the subarrays with the most urgent need to perform operations such as garbage collection. The information provided from each controller to the front end in this alternative implementation may be the number of free blocks available in each subarray. Thus the front end may periodically review the latest information on free block availability in the subarrays and prioritize those subarrays with the lowest level of free blocks over the others when selecting which controller/subarray pairings to allow to operate. Other parameters, activity thresholds and ways to select controllers for background operations are contemplated A system and method has been described for increasing the performance of a flash memory, which may be in the form of a solid state drive. Internal memory operations including block reclaim or garbage collection may be performed in the background of the drive without affecting foreground write operations of data received from a host. This ability to engage in concurrent foreground writing of host data and background execution of garbage collection operations can reduce the amount of foreground garbage collection that needs to be performed and thus can increase host data write speed.

It is intended that the foregoing detailed description be understood as an illustration of selected forms that the invention can take and not as a definition of the invention. It is only the following claims, including all equivalents, that are intended to define the scope of this invention. Also, some of the following claims may state that a component is operative to perform a certain function or configured for a certain task. It should be noted that these are not restrictive limitations. It should also be noted that the acts recited in the claims can be performed in any order and not necessarily in the order in which they are recited.

I claim:

1. A method of operating a memory system having an array of non-volatile memory cells, the method comprising the memory system:
    receiving data at a front end of the memory system from a host, wherein the data comprises a plurality of host logical block addresses (LBAs);
    selecting at least one subarray of a plurality of subarrays in the array in which to execute a host write operation for the received data, wherein each of the plurality of subarrays is associated with a unique, fixed region of host LBA addresses and each of the plurality of subarrays is associated with a separate subarray controller;
    selecting at least one other subarray of the plurality of subarrays in which to execute a second operation on data already residing in the at least one other subarray;
    executing the host write operation and the second operation substantially concurrently in the at least one subarray and the at least one other subarray;
    wherein the plurality of subarrays are arranged in a plurality of memory banks, each memory bank comprising at least two subarrays, and wherein the memory system comprises an activity limit, the method further comprising the front end preventing execution of the second operation upon detection that the activity limit will be exceeded; and
    wherein the activity limit comprises a maximum number of concurrent host write and second operations that is less than a total number of subarrays of the plurality of subarrays.

2. The method of claim 1, wherein the second operation is a copy operation, the copy operation comprising copying data from one location to another location within the other subarray.

3. The method of claim 1, wherein the second operation comprises a read operation.

4. The method of claim 1, wherein the second operation comprises a background operation, wherein the background operation comprises an operation initiated by the memory device when no host command relating to data within the unique, fixed region of host LBA addresses for the at least one other subarray is pending.

5. The method of claim 1, wherein selecting the at least one subarray and the at least one other subarray comprises selecting subarrays from within a same memory bank.

6. The method of claim 1, wherein the activity limit comprises a memory system power consumption limit.

7. The method of claim 1, wherein the activity limit comprises a memory system supply current limit.

8. A memory system comprising:
an array of non-volatile memory cells arranged into a plurality of subarrays, each subarray addressed by a unique, fixed region of host logical block address (LBA) addresses;
a plurality of subarray controllers, each of the plurality of subarray controllers configured to control data read or write operations in a respective one of the plurality of subarrays independent of read or write operations in any other of the plurality of subarrays; and
a front end controller in communication with the plurality of subarray controllers, the front end controller adapted to:
select at least one subarray of a plurality of subarrays in the array in which to execute a host write operation for data received from a host;
select at least one other subarray of the plurality of subarrays in which to execute a second operation on data already residing in the at least one other subarray;
initiate execution of the host write operation and the second operation substantially concurrently in the at least one subarray and the at least one other subarray;
wherein the plurality of subarrays are arranged in a plurality of memory banks, each memory bank comprising at least two subarrays, and wherein the memory system comprises an activity limit, the front end controller further configured to prevent execution of the second operation upon detection that the activity limit will be exceeded; and
wherein the activity limit comprises a maximum number of concurrent host write and second operations that is less than a total number of subarrays of the plurality of subarrays.

9. The memory system of claim 8, wherein the front end controller is configured to select the at least one subarray and the at least one other subarray from within a same memory bank.

10. The memory system of claim 9, wherein each memory bank comprises a single data channel in communication with the front end controller.

11. The memory system of claim 8, wherein the activity limit comprises a memory system power consumption limit.

12. The memory system of claim 8, wherein the activity limit comprises a memory system supply current limit.

13. The memory system of claim 8, wherein the second operation comprises a copy operation, the copy operation comprising copying data from one location to another location within the other subarray.

14. The memory system of claim 8, wherein the second operation comprises a read operation.

15. The memory system of claim 8, wherein the second operation comprises a background operation, and wherein the background operation comprises an operation initiated by the memory device when no host command relating to data within the unique, fixed region of host LBA addresses for the at least one other subarray is pending.

16. A memory system comprising:
an array of non-volatile memory cells arranged into a plurality of subarrays, each subarray addressed by a unique, fixed region of host logical block address (LBA) addresses;
wherein the subarrays are arranged in a two-dimensional array having an X-dimension and a Y-dimension, and wherein host LBA addresses are interleaved in host LBA metapage increments in the X-dimension and host LBA addresses are interleaved in metablock increments in the Y-dimension;
a plurality of subarray controllers, each of the plurality of subarray controllers configured to control data read or write operations in a respective one of the plurality of subarrays independent of read or write operations in any other of the plurality of subarrays; and
a front end controller in communication with the plurality of subarray controllers, the front end controller adapted to:
select at least one subarray of a plurality of subarrays in the array in which to execute a host write operation for data received from a host;
select at least one other subarray of the plurality of subarrays in which to execute a second operation; and
initiate execution of the host write operation and the second operation substantially concurrently in the at least one subarray and the at least one other subarray.

17. The memory system of claim 16, wherein each subarray comprises at least one metablock having a plurality of metapages and the unique, fixed region of host logical block address (LBA) addresses comprises interleaved metapage addresses across subarrays in each of the memory banks, such that for a particular subarray a first LBA address of a first metapage differs from a first LBA address of a next consecutive metapage in the particular subarray by an integer multiple of a length of a metapage and a total number of memory banks.

18. The memory system of claim 16, wherein the second operation comprises a background operation, and wherein the background operation comprises an operation initiated by the memory device when no host command relating to data within the unique, fixed region of host LBA addresses for the at least one other subarray is pending.

19. A memory system comprising:
an array of non-volatile memory cells arranged into a plurality of subarrays, each subarray addressed by a unique, fixed region of host logical block address (LBA) addresses;
a plurality of subarray controllers, each of the plurality of subarray controllers configured to control data read or write operations in a respective one of the plurality of subarrays independent of read or write operations in any other of the plurality of subarrays;
wherein the plurality of subarray controllers comprises a single processor configured to execute a separate instance of controller firmware for each subarray; and
a front end controller in communication with the plurality of subarray controllers, the front end controller adapted to:
select at least one subarray of a plurality of subarrays in the array in which to execute a host write operation for data received from a host;
select at least one other subarray of the plurality of subarrays in which to execute a second operation; and
initiate execution of the host write operation and the second operation substantially concurrently in the at least one subarray and the at least one other subarray.

20. The memory system of claim 19, wherein the second operation comprises a background operation, and wherein the background operation comprises an operation initiated by the memory device when no host command relating to data within the unique, fixed region of host LBA addresses for the at least one other subarray is pending.

21. A memory system comprising:
an array of non-volatile memory cells arranged into a plurality of subarrays, each subarray addressed by a unique, fixed region of host logical block address (LBA) addresses;

a plurality of subarray controllers, each of the plurality of subarray controllers configured to control data read or write operations in a respective one of the plurality of subarrays independent of read or write operations in any other of the plurality of subarrays;

wherein the plurality of subarray controllers comprises a plurality of processors, each processor associated with a different subarray and each processor positioned on a single die separate from any die comprising the subarrays; and a front end controller in communication with the plurality of subarray controllers, the front end controller adapted to:
select at least one subarray of a plurality of subarrays in the array in which to execute a host write operation for data received from a host;
select at least one other subarray of the plurality of subarrays in which to execute a second operation; and
initiate execution of the host write operation and the second operation substantially concurrently in the at least one subarray and the at least one other subarray.

22. The memory system of claim 21, wherein the second operation comprises a background operation, and wherein the background operation comprises an operation initiated by the memory device when no host command relating to data within the unique, fixed region of host LBA addresses for the at least one other subarray is pending.

23. A memory system comprising:
an array of non-volatile memory cells arranged into a plurality of subarrays, each subarray addressed by a unique, fixed region of host logical block address (LBA) addresses;
a plurality of subarray controllers, each of the plurality of subarray controllers configured to control data read or write operations in a respective one of the plurality of subarrays independent of read or write operations in any other of the plurality of subarrays;
wherein the plurality of subarray controllers comprises a plurality of processors, each processor associated with a different subarray and each processor positioned on a different die comprising a different one of the subarrays; and
a front end controller in communication with the plurality of subarray controllers, the front end controller adapted to:
select at least one subarray of a plurality of subarrays in the array in which to execute a host write operation for data received from a host;
select at least one other subarray of the plurality of subarrays in which to execute a second operation; and
initiate execution of the host write operation and the second operation substantially concurrently in the at least one subarray and the at least one other subarray.

24. The memory system of claim 23, wherein the second operation comprises a background operation, and wherein the background operation comprises an operation initiated by the memory device when no host command relating to data within the unique, fixed region of host LBA addresses for the at least one other subarray is pending.

25. A method of operating a memory system having an array of non-volatile memory cells, the method comprising the memory system:
receiving data at a front end of the memory system from a host, wherein the data comprises a plurality of host logical block addresses (LBAs);
selecting at least one subarray of a plurality of subarrays in the array in which to execute a host write operation for the received data, wherein each of the plurality of subarrays is associated with a unique, fixed discontinuous region of host LBA addresses and each of the plurality of subarrays is associated with a separate subarray controller;
selecting at least one other subarray of the plurality of subarrays in which to execute a second operation on data already residing in the other subarray; and
executing the host write operation and the second operation substantially concurrently in the at least one subarray and the at least one other subarray.

26. A memory system comprising:
an array of non-volatile memory cells arranged into a plurality of subarrays, each subarray addressed by a unique, fixed discontinuous region of host logical block address (LBA) addresses;
a plurality of subarray controllers, each of the plurality of subarray controllers configured to control data read or write operations in a respective one of the plurality of subarrays independent of read or write operations in any other of the plurality of subarrays; and
a front end controller in communication with the plurality of subarray controllers, the front end controller adapted to:
select at least one subarray of a plurality of subarrays in the array in which to execute a host write operation for data received from a host;
select at least one other subarray of the plurality of subarrays in which to execute a second operation; and
initiate execution of the host write operation and the second operation substantially concurrently in the at least one subarray and the at least one other subarray.

* * * * *